(12) United States Patent
Denks et al.

(10) Patent No.: US 10,155,272 B2
(45) Date of Patent: Dec. 18, 2018

(54) TOOL FOR MACHINING WORKPIECES

(71) Applicant: Kennametal Inc., Latrobe, PA (US)

(72) Inventors: Norbert Denks, Wlndsbach (DE); Sebastian Foettinger, Gunzenhausen (DE); Markus Heinloth, Postbauer-Heng (DE); Jochen Kurz, Markgröningen (DE); F. H. Erich Lill, Schwaig (DE); Guenter Sponsel, Steinsfeld (DE)

(73) Assignee: KENNAMETAL INC., Latrobe, PA (US)

(*) Notice: Subject to any disclaimer, the term of this patent is extended or adjusted under 35 U.S.C. 154(b) by 113 days.

(21) Appl. No.: 14/918,124

(22) Filed: Oct. 20, 2015

(65) Prior Publication Data

US 2016/0107250 A1 Apr. 21, 2016
US 2016/0271709 A9 Sep. 22, 2016

(30) Foreign Application Priority Data

Oct. 15, 2014 (DE) .................. 10 2014 220 933

(51) Int. Cl.
*B23C 5/16* (2006.01)
*B23D 43/06* (2006.01)
*B23C 5/22* (2006.01)

(52) U.S. Cl.
CPC ............ *B23D 43/06* (2013.01); *B23C 5/2234* (2013.01); *B23C 2270/025* (2013.01); *B23D 2043/063* (2013.01)

(58) Field of Classification Search
CPC ... B23C 5/08; B23C 5/2234; B23C 2270/025; B23D 2043/063
See application file for complete search history.

(56) References Cited

U.S. PATENT DOCUMENTS

| 4,771,933 | A | | 9/1988 | Rohm | |
|---|---|---|---|---|---|
| 6,098,258 | A | * | 8/2000 | Shimomura | B23C 5/08 29/27 C |
| 6,164,351 | A | * | 12/2000 | Weathers | B23C 5/08 144/134.1 |
| 6,203,477 | B1 | * | 3/2001 | Shimomura | B23C 3/06 409/200 |
| 6,805,520 | B2 | | 10/2004 | Gessell et al. | |
| 9,636,759 | B2 | | 5/2017 | Buob | |
| 2012/0321399 | A1 | * | 12/2012 | Wuerfels | B23C 5/2295 407/69 |

(Continued)

FOREIGN PATENT DOCUMENTS

| DE | 102008016636 A1 | 10/2009 |
|---|---|---|
| DE | 102012017419 A1 | 5/2014 |

(Continued)

OTHER PUBLICATIONS

Jun. 25, 2015—Office Action DE 10 2014 220 933.1.

*Primary Examiner* — Will Fridie, Jr.
(74) *Attorney, Agent, or Firm* — Matthew S. Bedsole

(57) ABSTRACT

A tool (2) for machining workpieces, comprising a carrier (4) rotating in an axial direction (A) during operation, and further comprising multiple cutting segments (6), which are fastened to the carrier (4) in a radial direction (R), characterized in that at least one hydraulic clamping unit (21) is attached to the carrier (4) for clamping at least one of the cutting segments (6) to the carrier (4).

18 Claims, 3 Drawing Sheets

(56) References Cited

U.S. PATENT DOCUMENTS

2013/0033009 A1* 2/2013 Hoffer ................... B23B 31/305
                                                              279/4.01
2014/0377022 A1* 12/2014 Brieden ................... B23F 9/10
                                                                407/99

FOREIGN PATENT DOCUMENTS

| DE | 102013210853 A1 | 12/2014 | |
|---|---|---|---|
| DE | 102014106516 A1 * | 11/2015 | ............. B23D 43/06 |
| EP | 2136951 B1 | 3/2011 | |

* cited by examiner

TOOL FOR MACHINING WORKPIECES

RELATED APPLICATION DATA

The present application claims priority pursuant to 35 U.S.C. § 119(a) to German Patent Application Number 1020142209331 filed Oct. 21, 2014 which is incorporated herein by reference in its entirety.

FIELD

The invention relates to a tool for machining workpieces, comprising a carrier rotating in an axial direction during operation, and further comprising multiple cutting segments, which are fastened to the carrier in the radial direction.

BACKGROUND

Such a tool is known from EP 2 136 951 B1 and is used, for example, for turning-turn broaching when manufacturing crankshafts. The cutting segments of the tool are fastened to the carrier by means of multiple bolts. A number of cassettes are, in turn, attached at each cutting segment to accommodate the inserts. The bolts engage the carrier radially in order to fasten each of the cutting segments to the carrier. In addition, it is possible to secure the cutting segments in the axial direction at clamping points.

SUMMARY

The object of the invention is to improve, and in particular to simplify, the fastening and replacement of cutting segments on the tool.

The object is achieved according to the invention by a tool having the features according to claim 1. Advantageous embodiments, refinements, and variants are the subject matter of the dependent claims.

The tool is designed for machining workpieces and particularly suitable for turning-turn broaching, for example for manufacturing crankshafts. The tool is in particular a rotating tool and has a carrier, which rotates in an axial direction during operation. The carrier thus has a rotational axis. In addition, it is possible to attach the tool to a machine tool by means of the carrier. Furthermore, the tool has multiple cutting segments, each of which is fastened to the carrier in the radial direction and around the same in a circumferential direction with respect to the axial direction. In doing so, the radial direction is understood to be each direction that is perpendicular to the axial direction. The cutting segments are formed, for example, as a single piece and provided with suitable cutting edges. Preferably, the cutting segments are designed in multiple pieces such that a number of cutting elements, particularly inserts, can be mounted on one cutting segment. To this end, a particular cutting segment has suitable mounts in which the cutting elements can be fastened. The mounts in this case are designed as insert seats integrated into the carrier or else as separate cassettes, which can be fastened, in turn, to the carrier.

In addition, there is at least one hydraulic clamping unit attached to the carrier in order to clamp at least one of the cutting segments to the carrier. To this end, the hydraulic clamping unit in particular includes a hydraulic fluid, which is used to actuate the clamping unit so as to generate hydraulic pressure. The hydraulic pressure, in turn, is translated into clamping force, which is used to hydraulically-mechanically clamp the at least one cutting segment to the carrier.

The advantages achieved with the invention are in particular that especially secure and robust locking of the cutting segments can be achieved by means of the hydraulic clamping unit in a particularly simple manner and with merely low complexity.

The fixing, by clamping, is advantageously not separate for each of the cutting segments but occurs instead jointly by means of a clamping ring. Thus, in a preferred embodiment, the cutting segments can be reversibly fixed to the carrier, by clamping, jointly by means of a clamping ring. Compared to separate clamping of each cutting segment, this makes the handling of the tool significantly simpler. In doing so, a clamping force is exerted onto multiple, or particularly all, of the cutting segments by the clamping ring during clamping. In addition, the clamping is advantageously reversible, wherein it is possible to simultaneously release all by means of the clamping ring of the cutting segments that are fixed, by clamping, by the clamping ring. The clamping ring in particular extends in a circumferential direction in the axial direction of the tool, similarly to the carrier. The ring can in particular be rotated in the axial direction concentrically with respect to the rotational axis of the carrier.

Expediently, the carrier and the clamping ring are spaced apart from one another in the axial direction and form a clamping groove in which the cutting segments are seated. During fixing by clamping, the cutting segments are held positively in the clamping groove in the axial direction by the carrier and by the clamping ring. In addition, the cutting segments are clamped into the clamping groove due to a clamping force acting in the axial direction.

In a suitable refinement, the clamping ring can be displaced in the axial direction relative to the carrier by means of the hydraulic clamping unit. In this way, it is advantageously possible to press the respective cutting segment against the carrier in the axial direction, i.e. to generate a clamping force in the axial direction, that is [to generate] an axial force and thus clamp the cutting segment to the carrier in the axial direction. This will in particular also prevent slippage of the cutting segment in the axial direction during operation. The distance between the clamping ring and the carrier in the axial direction can be set, in particular by means of the hydraulic clamping unit. By displacing the clamping ring, it is then possible to either fix, by clamping, or release the cutting segments.

Each of the cutting segments preferably has a segment base, which is seated in the clamping groove. At least one of the parts, selected from the parts that are the carrier and clamping ring, has a circumferential collar, which tapers the clamping groove on a radially external section and surrounds the segment base. In this manner, form locking also advantageously occurs in the radial direction, and the cutting segments are reliably secured against being moved during operation in the radial direction, for example due to centrifugal forces. The clamping groove in particular also forms an annular chamber, having an access slot which is located externally in the radial direction and from which the respective cutting segments protrude. The respective segment base of the cutting segment is seated in the clamping groove and engages the collar. A circumferential collar is formed at least either on the carrier or on the clamping ring. In a preferred variant, a collar is arranged both on the carrier and on the clamping ring. In the latter case, the segment base is then in particular surrounded by the collar on both sides and held in the clamping groove in an especially stable manner.

In a cross-section that is longitudinal with respect to the axial direction, the sections of the carrier and of the clamping ring which are spaced apart from one another in the axial direction each form an extension or else an arm extending in the radial direction, to the respective end of which located externally in the radial direction the collar is attached.

In an advantageous refinement, the collar has an oblique gripping surface, which points inwardly with respect to the clamping groove and engages an outwardly pointing, oblique shoulder surface of the segment base. As a result of this embodiment, it is advantageously possible to translate the axial movement of the clamping ring during the displacement in the axial direction into a radial movement of the cutting segments. In doing so, the gripping surface and the shoulder surface cooperate in particular in the manner of a bevel gear. The clamping force generated when clamping the clamping ring in the axial direction, which is also referred to as the axial force, is at least partially converted into a radial force acting radially inward by way of the oblique arrangement of the gripping and shoulder surfaces. In this manner, the segment base and the corresponding cutting segment are pulled toward the center of the tool. An oblique surface, here and hereinafter, is understood to mean in particular that the corresponding surface is inclined with respect to the axial direction. In particular, the gripping surface of the collar is formed in the shape of a truncated cone sheath. The shoulder surface of the segment base is preferably formed complementary thereto and in the manner of a segment of a truncated cone sheath.

So as to axially displace the clamping ring, a transformation element is expediently arranged on the carrier, which converts a radial movement generated by the clamping unit into an axial movement of the clamping ring. The hydraulic clamping unit thus preferably generates an actuating movement of a component in the radial direction, or at least not in the axial direction, which is converted into the desired axial movement of the clamping ring by means of the transformation element. This enables a compact design, since the carrier of such a tool is typically disk-shaped having only a small expansion in the axial direction. The radial expansion is typically a multiple of the expansion in the axial direction.

In a preferred embodiment, the transformation element is formed as a clamping wedge, which can be displaced in the radial direction by means of the hydraulic clamping unit. The clamping wedge has a wedge surface, by means of which said clamping wedge engages a wedge bearing surface of the clamping ring, particularly during clamping. The wedge surface and the wedge bearing surface have an oblique design, so that, as previously described in connection with the collar and the segment base, a radial force acting on the clamping wedge in the radial direction can be converted into an axial force acting in the axial direction. This force is then used to displace the clamping ring.

When the cutting segments are being clamped, the radial force acting on the clamping wedge is in particular directed to the outside in the radial direction. In doing so, the clamping wedge is acted on by hydraulic pressure generated by the hydraulic clamping unit. In general, a pressure ram movable in a cavity is in particular arranged in the hydraulic clamping unit. The pressure ram is fixedly connected to the transformation element, in particular to the clamping part, and can be moved, which is to say can be displaced, by way of the hydraulic fluid present in the clamping unit. Since the tool typically has a significantly larger expansion in the radial direction than in the axial direction, a significantly larger stroke is possible, and thus a particularly suitable clamping force can be generated, when displacing the clamping wedge in the radial direction.

So as to release the cutting segments, the hydraulic pressure is removed from the transformation element, in particular the clamping wedge, by means of the hydraulic clamping unit, so that the element, or the wedge, can be moved back into the opposite direction. In particular, the transformation element, in particular the clamping wedge, can be moved toward the inside in the radial direction during the release and is pulled or pressed toward the center of the tool, for example, by means of a return spring.

So as to prevent the clamping ring from falling off the tool, particularly in the release position of the clamping element, an pull-out limiter is attached to the tool. This pull-out limiter specifies a maximum axial pull-out of the tension disk during release of the cutting segments. Measured in the axial direction, this axial pull-out is selected in particular at least large enough such that a respective cutting segment can be removed from the clamping groove in the radial direction in the release position. Furthermore, the pull-out limiter suitably has an oblique contact surface facing the clamping ring, which is designed in particular similarly to the clamping surface of the clamping wedge and which rests against the wedge bearing surface of the clamping ring at maximum pull-out. In order to implement particularly effective pull-out protection, the pull-out limiter is expediently designed in the shape of a ring.

So as to generate hydraulic pressure by means of a hydraulic clamping unit, the tool preferably has a clamping element. The hydraulic clamping unit actuates said clamping element in order to clamp the cutting segment. To this end, the clamping element can be toggled between a clamping position and a release position so as to clamp and release the cutting segments. In doing so, a number of pressure pistons in the clamping unit are pressed in by means of the clamping element such that they initially reduce the cavity filled with the hydraulic fluid and, in this manner, the pressure pistons is driven out of the cavity.

In a suitable variant, the tool comprises multiple hydraulic clamping units, which can be jointly actuated by means of the clamping element, whereby, in turn, the handling and operation of the tool are significantly simplified. Preferably, at least one hydraulic clamping unit is attached to the carrier for each cutting segment, and all these hydraulic clamping units are jointly actuated by means of the clamping element, such that clamping of all cutting segments is possible in an especially simple manner. Likewise, the clamping is reversible by releasing the clamping element, and thus all cutting segments can be released simultaneously.

In a further suitable embodiment, the clamping element is designed as a rotating annulus, which can be toggled between the clamping position and the release position through rotation. The rotating annulus is rotatably mounted on the carrier. In particular, it can be rotated around the rotational axis and thus in the axial direction. Rotating into the clamping position then results in clamping of the cutting segments to the carrier, while rotating into the release position correspondingly results in release of the cutting segments. The rotating annulus is in particular designed as a ring and extends in the circumferential direction in the axial direction of the tool, similarly to the clamping ring. The rotation in order to toggle between the clamping position and the release position takes place accordingly in the circumferential direction in the axial direction. For rotation, the rotating annulus is in particular accessible in the axial direction and is, for example, operated manually or by means of a suitable accessory.

In order to toggle between the clamping position and the release position, preferably at least one eccentric actuating element is attached to the clamping element. Said actuating element is used to actuate the hydraulic clamping unit when toggling into the clamping position. When using multiple hydraulic clamping units, an eccentric actuating element is attached to the clamping element particularly for each of these clamping units. Especially in the case of a clamping element designed as a rotating annulus, during rotation of the same a translational motion of the eccentric actuating element in the circumferential direction, and thus a relative movement with respect to the hydraulic clamping unit, take place, so that the clamping unit is actuated in the aforementioned manner. During rotation of the rotating annulus, i.e. during rotation relative to the hydraulic clamping unit, the eccentric actuating element then acts upon the pressure pistons of the clamping unit. The eccentric actuating element may also be designed as a bulge or recess extending in the radial direction, for example one comprising protuberances. For example, the eccentric actuating element is integrally molded to the rotating annulus as a wedge-shaped step and attached to the rotating annulus pointing to the outside in the radial direction.

So as to attach the cutting segments, they are initially arranged in the release position distributed around the periphery of the carrier. In order to achieve, in particular, suitable positioning and distribution in the circumferential direction, at least one slot nut is fastened to the carrier for each of the cutting segments. Said slot nut is, for example, fixedly screwed to the carrier and forms a bearing contour for the corresponding cutting segment. Expediently, the respective cutting segment has a recess that is adapted to the slot nut, in which the slot nut is positively seated when positioned correctly.

So as to enable particularly simple replacement of the hydraulic clamping unit in the event the same should become damaged or fail, the clamping unit is designed as a self-contained assembly, which is mounted to the carrier. The design of the self-contained assembly additionally advantageously ensures that no hydraulic fluid inadvertently leaks from the clamping unit and contaminates the tool.

In an especially advantageous variant, one or more of the aforementioned aspects are combined with an embodiment of a tool, as it is described in application DE 10 2014 106 516.6 of the applicant, which is unpublished as of the time of application. A tool for turning-turn broaching of workpieces is likewise described therein, comprising a carrier to which multiple cutting segments comprising hydraulic clamping units can be fastened. A clamping bolt is described therein as a clamping element, which actuates the hydraulic clamping unit. The clamping bolt in this case presses against one or more pressure pistons of the hydraulic clamping unit. This actuating mechanism described in DE 10 2014 106 516.6 for the hydraulic clamping unit by means of the clamping bolt is combined with the aforementioned clamping by means of the clamping ring according to a first variant.

Furthermore, DE 10 2014 106 516.6 describes tension bolts for clamping the cutting segments in the radial direction, which engage the cutting segments and which clamp the cutting segments against the carrier in the radial direction when the hydraulic clamping unit is actuated. According to a second variant, said clamping mechanism having the tension bolts is combined with the joint actuation of multiple hydraulic clamping units described herein by means of a shared clamping element, particularly by means of a rotating annulus. Reference is made in this regard to the disclosure of DE 10 2014 106 516.6, which is hereby also included in the present application.

BRIEF DESCRIPTION OF THE DRAWINGS

An exemplary embodiment of the invention is described in greater detail hereafter based on a drawing. The following is shown schematically.

DETAILED DESCRIPTION

Figure 1:
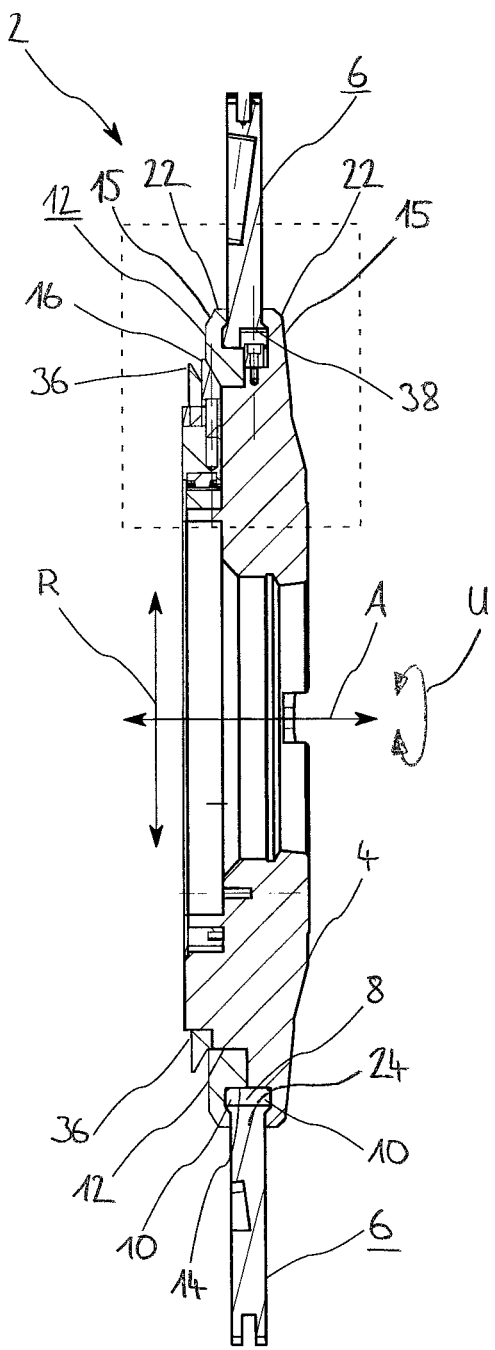
FIG. 1 shows a tool in a side sectional view.
Figure 2:
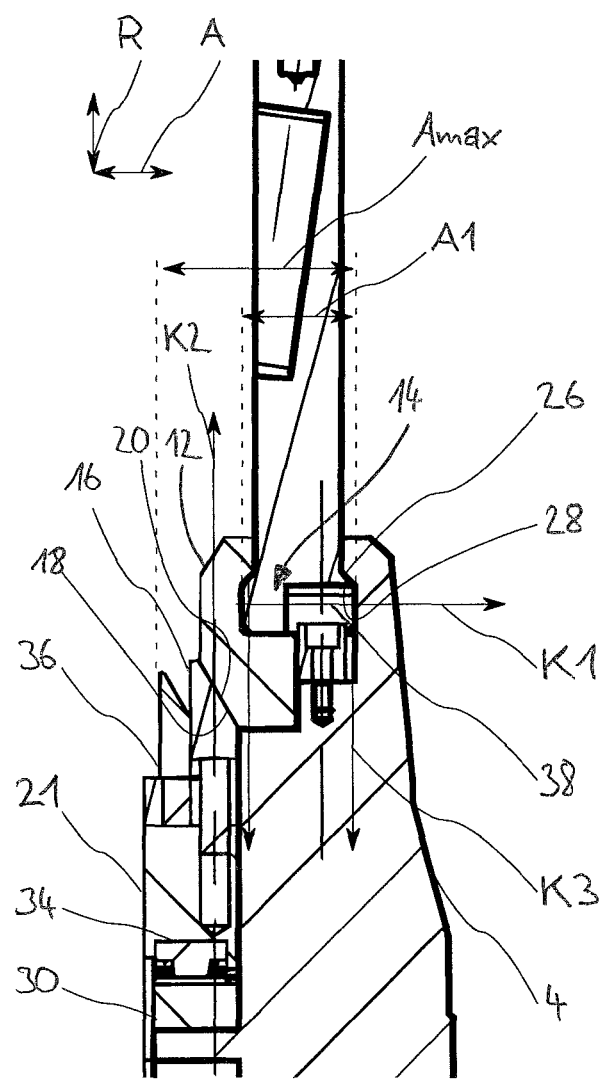
FIG. 2 shows a detail of the view according to FIG. 1.
Figure 3:
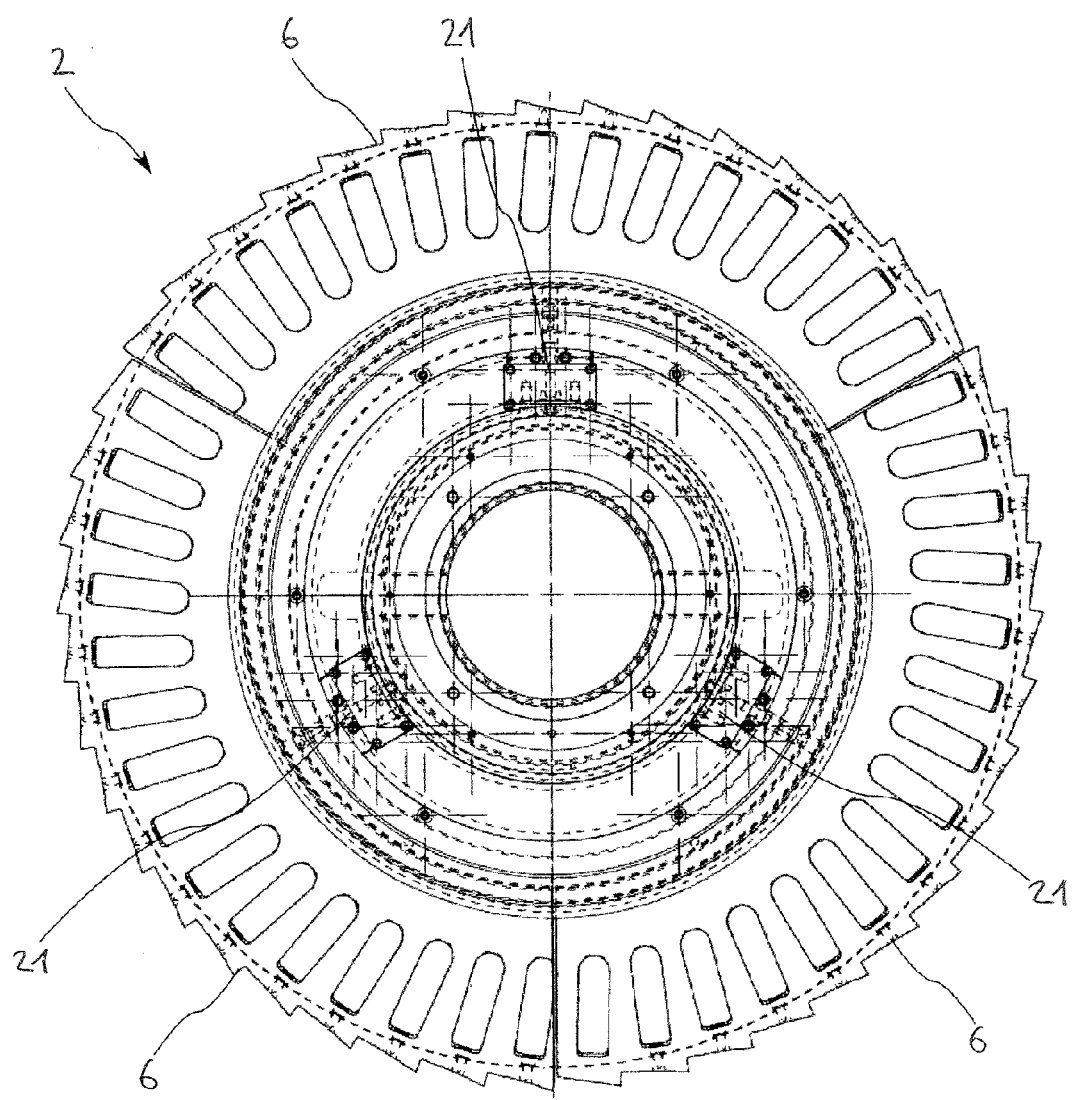
FIG. 3 shows the tool according to FIG. 1 in a front view.

FIGS. 1 and 2 show the longitudinal sectional view along an axial direction A of a tool 2, comprising a radially extending carrier 4, that is in the radial direction R, which is annular-shaped here and can be fastened to a machine tool, which is not shown in greater detail. Multiple cutting segments 6 are fastened on the outside of the carrier 4 in the radial direction R. They are used in particular for accommodating the inserts, which are not shown in more detail here. FIG. 2 shows an enlarged detail of FIG. 1, which is identified there by a dotted rectangle. FIG. 3 shows the tool 2 in a front view. The tool 2 is a turning-turn broaching tool, which rotates around a rotational axis in the axial direction A during operation. The entire tool 2 is preferably designed in the manner of a disk. The expansion thereof in the radial direction R is a multiple, for example at least 5 times the expansion in the axial direction A.

The cutting segments 6 each have a segment base 8 on the interior in the radial direction R, comprising two shoulders 10 here, which are arranged on opposing sides of the respective cutting segment 6 in the axial direction A. For fixing, by clamping, the cutting segment 6, the tool 2 comprises a clamping ring 12, which extends in a circumferential direction U in the axial direction A, just as the carrier 4. FIGS. 1 and 2 show the clamping ring 12 in the clamping position. The segment base 8 is clamped in a clamping groove 14, which is formed by the clamping ring 12 and the carrier 4. The clamping ring 12 and the carrier 4 have extensions 15 pointing toward the outside in the radial direction R, which are spaced apart from one another by a distance A1.

The clamping ring 12 exerts an axial force K1, which is also referred to as the clamping force, in the axial direction A, which is used to hold the cutting segments 6. This axial force K1 is generated, in particular, by a clamping wedge 16, which can be displaced in the radial direction R. To this end, said clamping wedge 16 has a wedge surface 18, which is obliquely inclined with respect to the axial direction A and presses against a wedge bearing surface 20 of the clamping ring 12. For direct generation of the axial force K1, a number of hydraulic clamping units 21 are attached to the carrier 4. They can be used to generate a radial force K2 acting outwardly in the radial direction R by way of hydraulic fluid, which is not shown in more detail here, with radial force K2 being usable to displace the clamping wedge 16 in the radial direction R. Said radial force K2 is then at least partially converted into the axial force K1 as a result of the cooperation between the wedge surface 16 and the wedge bearing surface 18.

In the exemplary embodiment shown here, the radial extensions 15 of the clamping ring 12 and of the carrier 4 each transition into a collar 22, which tapers the clamping groove 14 toward the exterior in the radial direction R and, in this manner, forms an access slot 24 on the periphery of the tool, which can be used to access the clamping groove 14. In addition, the collars each comprise a gripping surface 26 pointing toward the clamping groove 14 and surround the segment base 8 such that said gripping surfaces 26 rest against outwardly pointing shoulder surfaces 28 of the shoulders 10 of the cutting segment 6. Similarly to the aforementioned translation of the radial force K2 into the axial force K1, a partial translation of the axial force K1 into an inwardly directed radial force K3 in the radial direction R occurs in this manner. This results, in particular, in inward pulling of the cutting segment 6. It is particularly apparent from FIG. 2 that the respective collars 22 of the extensions 15 surround the segment base 8 in the manner of tongs and, in doing so, clamp the base in the axial direction A as well as in the radial direction R.

So as to bring the clamping wedge 16 into the clamping position, the tool 2 comprises a clamping element 30, which is designed as a rotating annulus here, which is used to actuate the hydraulic clamping unit 21. To this end, the clamping element 30 has an eccentric actuating element 34 in the exemplary embodiment shown here, which is implemented as a step here. Said step is pushed into the clamping unit 21 during rotation such that a number of pressure pistons, which are not shown in more detail, are operated in order to displace hydraulic fluid present in the hydraulic clamping unit 21, whereby, in turn, a pressure piston, which is likewise not shown here, is driven out, which ultimately pushes the clamping wedge 16 outward.

For release, the clamping element 30 is transferred into a release position, whereby the hydraulic pressure on the clamping wedge 16 is reduced, and the same can be displaced inwardly in the radial direction R. The clamping wedge 16 is automatically pushed back, for example, by means of a return spring, which is not shown in more detail here. Due to the pushed-back clamping wedge 16, it is then possible to enlarge the distance A1 between the clamping ring 12 and the carrier 4 such that the cutting segments 6 can be removed from the clamping groove 14. So as to prevent the clamping ring 12 from falling off the tool 2 while doing so, a pull-out protection device 36 is arranged additionally in the axial direction A with respect to the carrier 4, the pull-out protection device being designed in the shape of a ring here and preventing displacement of the clamping ring 12 beyond a maximum distance $A_{max}$. This distance is suitably at least the sum of the distance A1 and the width of the shoulders 10 in the axial direction A.

So as to position the cutting segments 6 correctly in the circumferential direction U with respect to the carrier 4 during insertion, slot nuts 38 are additionally screwed onto the carrier 4, onto which a respective cutting segment 6 can be placed, particularly in the radial direction R. A suitable recess, in which the slot nut 38 is seated when positioned correctly, is introduced for this purpose into the cutting segment 6 in a manner that is not shown in more detail here.

The invention claimed is:

1. A tool for machining workpieces, comprising a carrier rotating in an axial direction during operation, and further comprising multiple cutting segments, which are fastened to the carrier in a radial direction,
    wherein at least one hydraulic clamping unit is attached to the carrier for clamping at least one of the cutting segments to the carrier; and
    wherein the cutting segments can be reversibly fixed, by clamping, to the carrier jointly by a clamping ring.

2. The tool according to claim 1, wherein the carrier and the clamping ring are spaced apart from one another in the axial direction and form a clamping groove in which the cutting segments are seated.

3. The tool according to claim 1, wherein the clamping ring can be displaced in the axial direction relative to the carrier for this purpose by means of the hydraulic clamping unit.

4. The tool according to claim 2, wherein each of the cutting segments has a segment base, which is seated in the clamping groove, and at least one of the parts, selected from the parts that are the carrier and clamping ring, has a circumferential collar, which tapers the clamping groove on a radially external section and surrounds the segment base.

5. The tool according to claim 4, wherein the collar has an oblique gripping surface which points inwardly with respect to the clamping groove and engages an outwardly pointing, oblique shoulder surface of the segment base.

6. The tool according to claim 1, wherein a transformation element, which is designed to transform a radial movement generated by the hydraulic clamping unit into an axial movement of the clamping ring, is arranged on the carrier.

7. The tool according to claim 6, wherein the transformation element has a clamping wedge, which can be displaced in the radial direction by means of the hydraulic clamping unit and, with a wedge surface, engages a wedge bearing surface of the clamping ring so as to axially displace the same.

8. The tool according to claim 1, wherein a pull-out limiter, which specifies a maximum axial pull-out of the clamping ring during detachment of the cutting segments.

9. The tool according to claim 1 further comprising a clamping element which is used to generate hydraulic pressure by means of the hydraulic clamping unit and, for this purpose, can be toggled between a clamping position and a release position, so as to clamp and release the cutting segments.

10. The tool according to claim 9, wherein the at least one hydraulic clamping unit comprises multiple hydraulic clamping units which can be actuated jointly by means of the clamping element.

11. The tool according to claim 9, wherein the clamping element is formed as a rotating annulus which can be toggled between the clamping position and the release position by a rotation.

12. The tool according to claim 9, wherein in order to toggle between the clamping position and the release position, at least one eccentric actuating element is attached on the clamping element so as to actuate the hydraulic clamping unit when toggling into the clamping position.

13. The tool according to claim 1, wherein at least one slot nut is fastened to the carrier for each of the cutting segments so as to position the cutting segments in the circumferential direction.

14. The tool according to claim 1, wherein the hydraulic clamping unit is a self-contained assembly which is mounted to the carrier.

15. A tool for machining workpieces, comprising a carrier rotating in an axial direction during operation, and further comprising multiple cutting segments, which are fastened to the carrier in a radial direction,
    wherein at least one hydraulic clamping unit is attached to the carrier for clamping at least one of the cutting segments to the carrier; and
    wherein a clamping element, which is used to generate hydraulic pressure by means of the hydraulic clamping unit and, for this purpose, can be toggled between a clamping position and a release position, so as to clamp and release the cutting segments; and wherein the at least one hydraulic clamping unit comprises multiple hydraulic clamping units which can be actuated jointly by means of the clamping element.

16. A tool for machining workpieces, comprising a carrier rotating in an axial direction during operation, and further comprising multiple cutting segments, which are fastened to the carrier in a radial direction, wherein at least one hydraulic clamping unit is attached to the carrier for clamping at least one of the cutting segments to the carrier; and wherein a clamping element, which is used to generate hydraulic pressure by means of the hydraulic clamping unit and, for this purpose, can be toggled between a clamping position and a release position, so as to clamp and release the cutting segments; and wherein the clamping element is adapted to be toggled between the clamping position and the release position by at least one of the following (a) or (b):

(a) the clamping element is formed as a rotating annulus, which can be toggled between the clamping position and the release position by a rotation; or (b) in in order to toggle between the clamping position and the release position, at least one eccentric actuating element is attached on the clamping element so as to actuate the hydraulic clamping unit when toggling into the clamping position.

17. The tool according to claim 16, wherein the clamping element is formed as a rotating annulus, which can be toggled between the clamping position and the release position by a rotation.

18. The tool according to claim 16, wherein in order to toggle between the clamping position and the release position, at least one eccentric actuating element is attached on the clamping element so as to actuate the hydraulic clamping unit when toggling into the clamping position.

* * * * *